US011594064B2

(12) United States Patent
Niu et al.

(10) Patent No.: US 11,594,064 B2
(45) Date of Patent: Feb. 28, 2023

(54) DISPLAY SUBSTRATE, DISPLAY PANEL AND DISPLAY DEVICE

(71) Applicant: BOE Technology Group Co., Ltd., Beijing (CN)

(72) Inventors: Jing Niu, Beijing (CN); Changfeng Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/199,701

(22) Filed: Mar. 12, 2021

(65) Prior Publication Data

US 2022/0019755 A1    Jan. 20, 2022

(30) Foreign Application Priority Data

Jul. 20, 2020    (CN) .......................... 202010697304.3

(51) Int. Cl.
| G06V 40/13 | (2022.01) |
| G06V 10/147 | (2022.01) |
| G02F 1/1335 | (2006.01) |
| G02F 1/1368 | (2006.01) |

(52) U.S. Cl.
CPC ........ *G06V 40/1318* (2022.01); *G02F 1/1368* (2013.01); *G02F 1/133512* (2013.01); *G06V 10/147* (2022.01)

(58) Field of Classification Search
CPC .............. G06V 40/1318; G06V 10/147; G02F 1/133512; G02F 1/1368; G02F 1/13312; G02F 1/136227; G02F 1/13338; G02F 1/1333; G02F 1/133345
See application file for complete search history.

(56) References Cited

U.S. PATENT DOCUMENTS

| 2005/0082534 A1 | 4/2005 | Kim et al. |
| 2010/0007632 A1* | 1/2010 | Yamazaki ........... H01L 27/3234 345/175 |
| 2016/0232397 A1* | 8/2016 | Yu ......................... H01L 31/173 |
| 2020/0219455 A1* | 7/2020 | Lius .................. G02F 1/133617 |
| 2021/0233973 A1 | 7/2021 | Han et al. |

FOREIGN PATENT DOCUMENTS

| CN | 1610461 A | 4/2005 |
| CN | 203553175 U | 4/2014 |
| CN | 109728060 A | 5/2019 |

OTHER PUBLICATIONS

Chinese Office Action from 202010697304.3 dated Oct. 21, 2022.

* cited by examiner

*Primary Examiner* — Abhishek Sarma
(74) *Attorney, Agent, or Firm* — ArentFox Schiff LLP; Michael Fainberg

(57) ABSTRACT

A display substrate includes: a base substrate, a drive circuit on the base substrate, an insulating layer on a side of the drive circuit away from the base substrate, and a fingerprint recognition device on a side of the insulating layer away from the base substrate. The fingerprint recognition device includes: a first electrode, a photosensitive layer and a second electrode that are disposed in a stacked manner. The first electrode electrically connects to the drive circuit through a via hole running through the insulating layer; and the first electrode forms a recess in the via hole, and the recess is filled with an insulating material, so that a surface of the first electrode on a side away from the base substrate is a flat surface, and the photosensitive layer is disposed on the flat surface.

11 Claims, 5 Drawing Sheets

DISPLAY SUBSTRATE, DISPLAY PANEL AND DISPLAY DEVICE

CROSS REFERENCE TO RELATED APPLICATION

This application is based on and claims priority under 35 U.S.C 119 to Chinese Patent Application No. 202010697304.3, filed on Jul. 20, 2020, in the China National Intellectual Property Administration. The entire disclosure of the above application is incorporated herein by reference.

FIELD

The disclosure relates to the field of display technology, and in particular to a display substrate, a display panel and a display device.

BACKGROUND

The display substrate integrated fingerprint recognition technology is a panel integrated technology that provides a fingerprint recognition function without reducing an effective display area of a display substrate. The display substrate is generally integrated with an optical fingerprint recognition module. Light emergent from the display substrate is reflected by a finger, enters the display substrate again and is received by the fingerprint recognition module. The fingerprint recognition module can generate different recognition information according to the difference in light reflection by valleys and ridges of finger surface, thereby being able to identify different fingerprint information.

SUMMARY

Embodiments of the disclosure provide a display substrate, a display panel and a display device.

Embodiments of the disclosure provide a display substrate, including: a base substrate, a drive circuit on the base substrate, an insulating layer on a side of the drive circuit away from the base substrate, and a fingerprint recognition device on a side of the insulating layer away from the base substrate. The fingerprint recognition device includes: a first electrode, a photosensitive layer and a second electrode that are disposed in a stacked manner. The first electrode electrically connects to the drive circuit through a via hole running through the insulating layer; and the first electrode forms a recess in the via hole, and the recess is filled with an insulating material, so that a surface of the first electrode on a side away from the base substrate is a flat surface, and the photosensitive layer is disposed on the flat surface.

Embodiments of the disclosure further provide a display panel, including an opposite substrate and a display substrate disposed oppositely, wherein the opposite substrate includes a black matrix having a plurality of pixel openings and a plurality of fingerprint recognition openings. The display substrate is the above-mentioned display substrate according to some embodiments of the disclosure, and the display substrate has a plurality of pixel areas and fingerprint recognition areas between the pixel areas, the pixel opening corresponding to the pixel areas, and the fingerprint recognition openings corresponding to the fingerprint recognition areas.

Embodiments of the disclosure further provide a display device, including a backlight module and a display panel disposed oppositely. The display panel is the above-mentioned display panel according to some embodiments of the disclosure, and the backlight module is disposed on a side of the display substrate away from the opposite substrate.

DETAILED DESCRIPTION OF THE EMBODIMENTS

Figure 1:
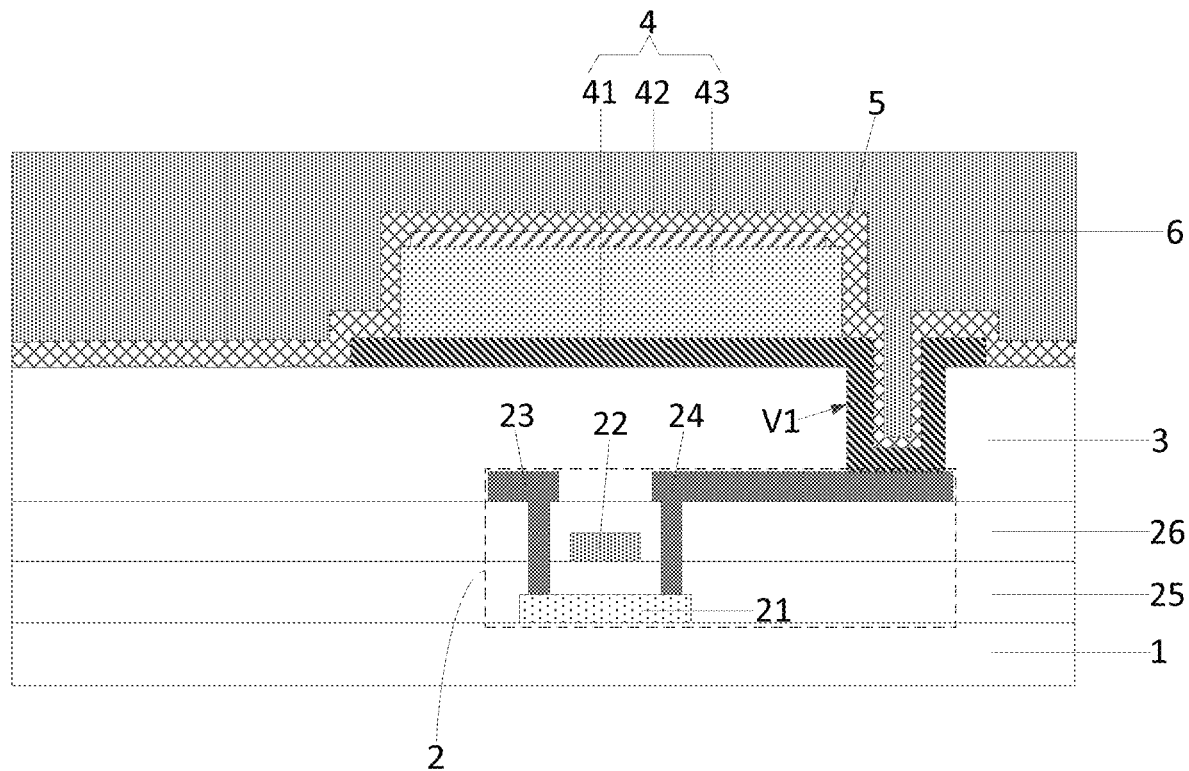
FIG. 1 is a schematic structural diagram of a display substrate according to some embodiments of the disclosure.

To make the objectives, technical solutions and advantages of the disclosure clearer, specific implementations of a display substrate, a display panel, and a display device provided by embodiments of the disclosure will be described in detail below in conjunction with the accompanying drawings.

The thickness and shape of each layer of film in the drawings do not reflect the true scale of the display substrate, and are merely intended to illustrate the disclosure.

At present, in-display fingerprint recognition technology that combines an optical sensor and display generally has a structure of a display panel with an amorphous silicon PIN device. The structure that combines an LTPS (Low-Temperature PolySilicon) panel exhibiting high mobility and good stability and an amorphous silicon PIN device has a great prospect of development in the display field. In the technology that combines an LTPS panel and an amorphous silicon PIN device, due to a complex circuit structure and numerous wires, and to ensure an maximum area of the PIN device, many wires and via holes are usually provided under the PIN device. A bottom electrode of the PIN device and an LTPS TFT are connected by a via hole running through a planarization layer right below the PIN. The depth of the via hole is 1.5 µm-2 µm. A height difference caused by the via hole leads to low flatness of the PIN device, which leads to an increase in dark current, ultimately resulting in serious noise in the PIN device, and causing a poor fingerprint recognition effect and a low fingerprint recognition rate.

Figure 2:
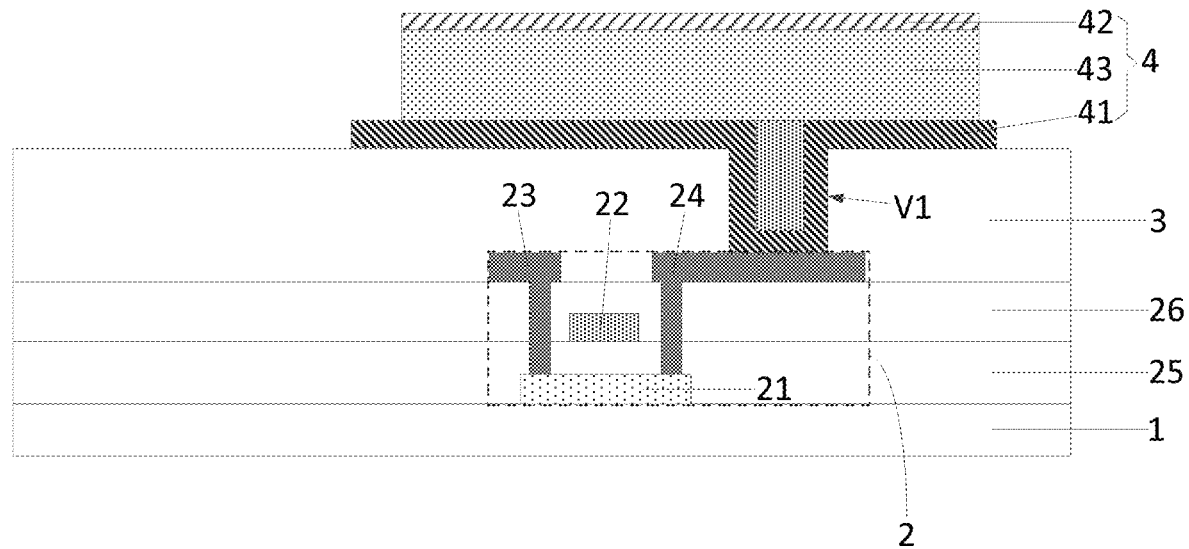
FIG. 2 is a schematic structural diagram of another display panel according to some embodiments of the disclosure.

In order to at least solve the problem of poor fingerprint recognition caused by the non-flatness of the PIN device, embodiments of the disclosure provide a display substrate, as shown in FIGS. 1 and 2. The structure includes: a base substrate 1, a drive circuit 2 on the base substrate 1, an insulating layer 3 on a side of the drive circuit 2 away from the base substrate 1, and a fingerprint recognition device 4 on a side of the insulating layer 3 away from the base substrate 1.

The fingerprint recognition device 4 includes a first electrode 41, a photosensitive layer 43 and a second electrode 42 that are disposed in a stacked manner, and the first electrode 41 electrically connects to the drive circuit 2 through a via hole V1 running through the insulating layer 3.

The first electrode 41 forms a recess in the via hole V1, and the recess is filled with an insulating material, so that a surface of the first electrode 41 on a side away from the base substrate 1 is a flat surface, and the photosensitive layer 43 is disposed on the flat surface.

In the above-mentioned display substrate provided in the embodiment of the disclosure, as the recess formed in the via hole V1 by the first electrode 41 of the fingerprint recognition device 4 is filled with the insulating material, so that the surface of the first electrode 41 on the side away from the base substrate 1 is a flat surface. Since the photosensitive layer 43 is disposed on such flat surface, the flatness of the fingerprint recognition device can be improved, to reduce a dark current of the fingerprint recognition device, thereby improving the accuracy of fingerprint recognition.

In some embodiments, to enable the photosensitive layer of the fingerprint recognition device to be on the flat surface, in the above-mentioned display substrate provided in the embodiment of the disclosure, as shown in FIG. 1, an orthographic projection of the via hole V1 on the base substrate 1 and an orthographic projection of the photosensitive layer 43 on the base substrate 1 do not overlap. That is, the via hole V1 is not under the fingerprint recognition device 4 in a direction towards the base substrate, so that the fingerprint recognition device 4 is fabricated on the flat surface of the first electrode 41 to ensure the flatness of the fingerprint recognition device 4.

As shown in FIG. 1, after the fingerprint recognition device 4 is fabricated, to ensure the flatness of the display substrate, a planarization layer is formed above the fingerprint recognition device 4. The material of the planarization layer is generally resin, and the film layer where the first electrode 41 is located is a source-drain metal layer. The adhesion between the resin and the source-drain metal layer is poor, and the resin material has a poor ability to block water and oxygen, which affects the conductivity of the electrode. Thus, before the planarization layer is formed above the fingerprint recognition device 4, the display substrate further includes: a first protective layer 5 on a side of the second electrode 42 away from the base substrate 1, and a first planarization layer 6 on a side of the first protective layer 5 away from the base substrate 1. A part of the first protective layer 5 is provided in the recess, and the first planarization layer 6 fills the recess. The first protective layer 5 enhances the adhesion between the subsequent first planarization layer 6 and the source-drain metal layer, and has relatively good performance of blocking water and oxygen. The material of the first protective layer 5 is an inorganic material, such as silicon nitride, or silicon oxide.

Figure 3:
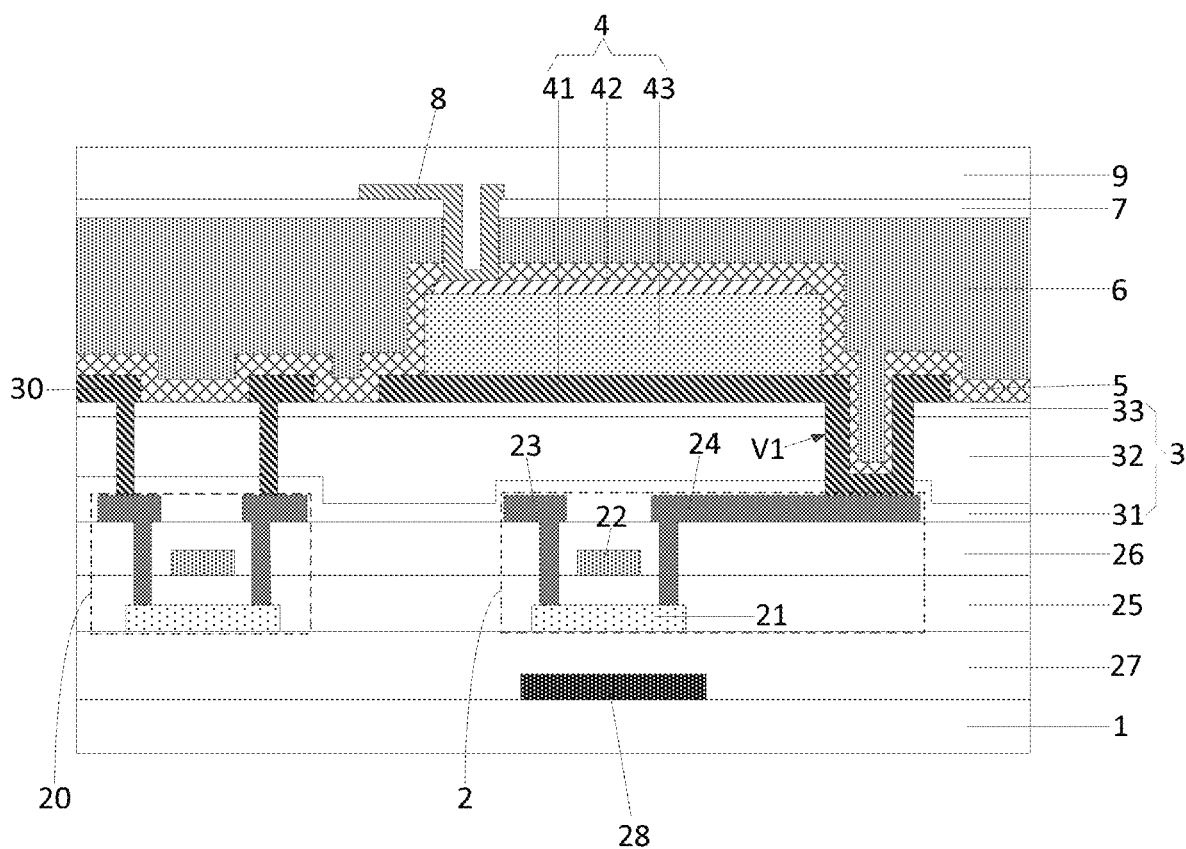
FIG. 3 is a schematic structural diagram of yet another display panel according to some embodiments of the disclosure.

In some embodiments, the above-mentioned display substrate provided in the embodiment of the disclosure, as shown in FIG. 3, further includes: a second protective layer 7 on a side of the first planarization layer 6 away from the base substrate 1, a bias voltage layer 8 on a side of the second protective layer 7 away from the base substrate 1, and a second planarization layer 9 on a side of the bias voltage layer 8 away from the base substrate 1. The bias voltage layer 8 is electrically connected to the second electrode 42 through a via hole V2 running through the first protective layer 5, the first planarization layer 6 and the second protection layer 7. In some embodiments, the first planarization layer 6 is provided to ensure the flatness of the display substrate after the fingerprint recognition device 4 is fabricated; as the material of the bias voltage layer 8 is generally a metal material, the second protective layer 7 is provided to enhance the adhesion between the bias voltage layer 8 and the base substrate 1 and to ensure its conductivity; and the second planarization layer 9 is provided to protect a metal electrode structure of the bias voltage layer 8. The materials of the first planarization layer 6 and the second planarization layer 9 are resin, and the material of the second protective layer 7 is an inorganic material, such as silicon nitride, or silicon oxide. The function of the bias voltage layer 8 is to apply a reverse bias voltage to the second electrode 42 so that the fingerprint recognition device 4 works under the reverse bias voltage.

The flatness of the fingerprint recognition device 4 shown in FIGS. 1 and 3 is achieved by moving the via hole V1 that is otherwise right below the fingerprint recognition device 4 from the position right below the fingerprint recognition device 4. For a liquid crystal display device, during actual fabrication, the fingerprint recognition device 4 corresponds to an opening area of a black matrix on an opposite substrate, that is, the fingerprint recognition device 4 is located in a non-pixel area. In some embodiments, due to a small size of the non-pixel area, the via hole V1 is moved by reducing the area of the fingerprint recognition device 4 in actual design.

Figure 4:
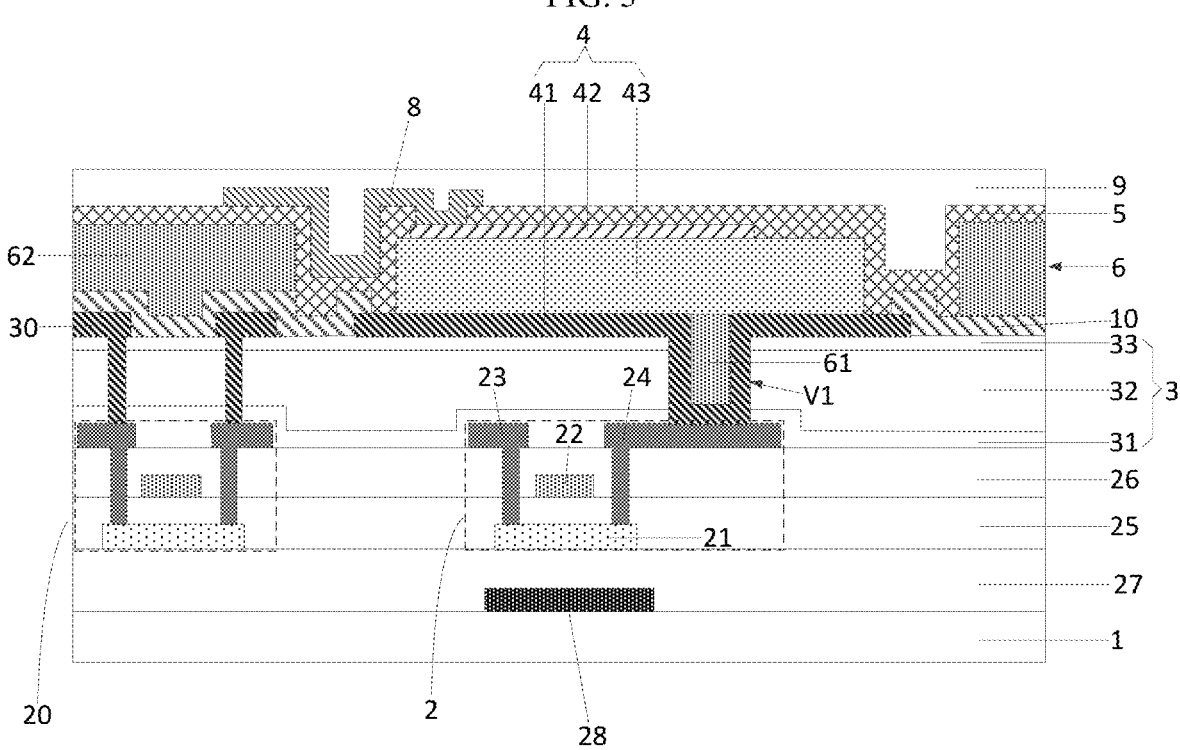
FIG. 4 is a schematic structural diagram of still another display panel according to some embodiments of the disclosure.

In some embodiments, the disclosure also provides a display substrate, as shown in FIGS. 2 and 4, where an orthographic projection of the photosensitive layer 43 on the base substrate 1 covers an orthographic projection of the via hole V1 on the base substrate 1.

As shown in FIG. 4, the display substrate further includes a first planarization layer 6 between the first electrode 41 and the photosensitive layer 43, the first planarization layer 6 including a first portion 61 filling the recess. That is, the first electrode 41 is coated with a film layer of a resin material thereon before fabrication of the photosensitive layer 43 in the disclosure. Due to the fluidity of the resin material, the resin material fills the recess. Then the resin material film layer is exposed and developed to remove the resin material on the first electrode 41 in flat area by development, such that the first portion 61 of the first planarization layer 6 filling the recess is formed in the recess, and the photosensitive layer 43 is formed after the recess is filled. This solution ensures the flatness of the fingerprint recognition device 4 without reducing the area of the fingerprint recognition device 4. Therefore, the structure shown in FIGS. 2 and 4 not only ensures a lower dark current of the fingerprint recognition device 4, but also ensures a minimum loss of the area of the fingerprint recognition device 4, and significantly improves a signal-to-noise ratio of a product.

In some embodiments, in the above-mentioned display substrate provided in the embodiment of the disclosure, as shown in FIG. 4, the first planarization layer 6 further includes a second portion 62. An orthographic projection of the second portion 62 on the base substrate 1 and an orthographic projection of the fingerprint recognition device 4 on the base substrate 1 do not overlap. In this way, the first planarization layer 6 not only fills the recess, but also exposes the first electrode 41 to fabricate subsequent film layers such as the photosensitive layer 43.

In some embodiments, the material of the first planarization layer is generally resin, and the film layer where the first electrode is located is a source-drain metal layer. The adhesion between the resin and the source-drain metal layer is poor, and the resin material has a poor ability to block water and oxygen, which affects the conductivity of the electrode. Thus, the above-mentioned display substrate provided in the embodiment of the disclosure, as shown in FIG. 4, further includes a first passivation layer 10 between the first planarization layer 6 and the first electrode 41, the first passivation layer 10 having an opening that exposes the photosensitive layer 43. The first passivation layer 10 enhances the adhesion between the first planarization layer 6 and the source-drain metal layer, and has relatively good performance of blocking water and oxygen. The material of the first passivation layer 10 is an inorganic material, such as silicon nitride, or silicon oxide.

In some embodiments, the above-mentioned display substrate provided in the embodiment of the disclosure, as shown in FIG. 4, further includes: a first protective layer 5 on a side of the second electrode 42 away from the base substrate 1, a bias voltage layer 8 on a side of the first protective layer 5 away from the base substrate 1, and a second planarization layer 9 on a side of the bias voltage layer 8 away from the base substrate 1. The bias voltage layer 8 is electrically connected to the second electrode 42 through a via hole running through the first protective layer 5. In some embodiments, the bias voltage layer 8 is fabricated after fabrication of the second electrode 42 of the fingerprint recognition device electrode 4. As the material of the bias voltage layer 8 is generally a metal material, the first protective layer 5 is provided to enhance the adhesion between the bias voltage layer 8 and the base substrate 1 and to ensure its conductivity, and the second planarization layer 9 is provided to protect a metal electrode structure of the bias voltage layer 8. The material of the second planarization layer 9 is resin, and the material of the first protective layer 5 is an inorganic material, such as silicon nitride, or silicon oxide.

In some embodiments, in the above-mentioned display substrate provided in the embodiment of the disclosure, as shown in FIGS. 1 to 4, the drive circuit 2 includes a thin film transistor, the thin film transistor including an active layer 21, a gate 22, and a source 23 and drain 24 successively stacked on the base substrate 1. The first electrode 41 is electrically connected to the drain 24 through the via hole running through the insulating layer 3. The fingerprint recognition device 4 receives light reflected by a finger and converts it into an electrical signal. The electrical signal is transmitted to an external detection circuit through the drive circuit to perform fingerprint recognition.

In some embodiments, the above-mentioned display substrate provided in the embodiment of the disclosure, as shown in FIGS. 1 to 4, further includes: a gate insulating layer 25 between the active layer 21 and the gate 22, an interlayer dielectric layer 26 between the gate 22 and the source 23 and drain 24, a buffer layer 27 between the base substrate 1 and the active layer 21, and a light shielding layer 28 between the buffer layer 27 and the base substrate 1, an orthographic projection of the light shielding layer 28 on the base substrate 1 covering an orthographic projection of the active layer 21 on the base substrate 1 to prevent the performance of the active layer 21 from being destroyed due to light irradiation.

In some embodiments, in the above-mentioned display substrate provided in the embodiment of the disclosure, the display substrate includes a plurality of pixel areas, and a non-pixel area between the pixel areas. The display substrate is generally fit to an opposite substrate to form a display device. For a display device, the opposite substrate includes color filters and a black matrix between the color filters. To ensure an original aperture ratio of the liquid crystal display device, the fingerprint recognition device is provided at a position corresponding to the black matrix, and the black matrix is provided with an opening to expose the fingerprint recognition device, so as to form a light channel through which the fingerprint recognition device receives reflected light to perform fingerprint recognition. As shown in FIGS. 1 to 4, the drive circuit 2 and the fingerprint recognition device 4 electrically connected to the drive circuit 2 are located in the non-pixel area. The pixel area includes a pixel circuit and a pixel electrode electrically connected to the pixel circuit. A thin film transistor 20 on the left of the structure shown in FIGS. 1 to 4 represents a structure of the pixel circuit, and the thin film transistor 20 is structurally same as that of the drive circuit 2 on the right. The film layer where the source 23 and the drain 24 in the drive circuit 2 are located is a first source-drain metal layer, and the film layer where the first electrode 41 in the fingerprint recognition device 4 is located is a second source-drain metal layer. To ensure the lap joint performance between the pixel electrode in the pixel area and the first source-drain metal layer, the second source-drain metal layer further includes a lap joint electrode 30 to achieve lap joint between the pixel electrode and the first source-drain metal layer.

In some embodiments, in the above-mentioned display substrate provided in the embodiment of the disclosure, as shown in FIGS. 3 and 4, the insulating layer 3 includes a second passivation layer 31, a third planarization layer 32, and a third passivation layer 33 successively stacked between the drive circuit 2 and the first electrode 41. In some embodiments, the second passivation layer 31 is to increase the adhesion between the first source-drain metal layer (the film layer where the source 23 and the drain 24 are located) and the third planarization layer 32, and the third planarization layer 32 is to enhance the flatness of the display substrate after the drive circuit is fabricated, and the third passivation layer 33 is to enhance the adhesion between the second source-drain metal layer (the film layer where the first electrode 41 is located) and the third planarization layer 32.

Figure 5:
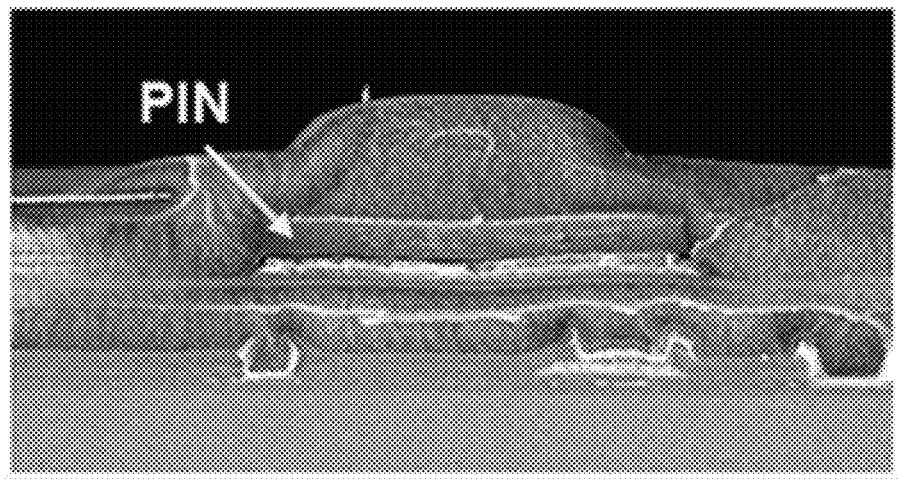
FIG. 5 is a schematic structural diagram of an electron microscope picture of a display substrate according to some embodiments of the disclosure.
Figure 6:
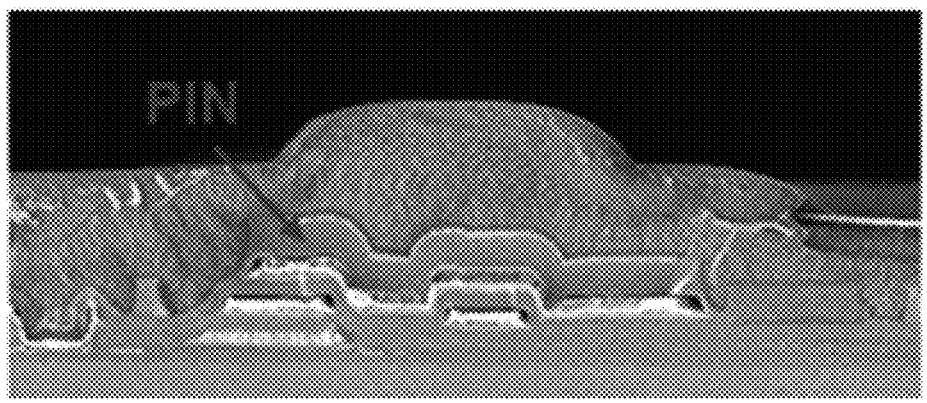
FIG. 6 is a schematic structural diagram of an electron microscope picture of a display substrate in the related art.

The following is comparative description of a dark current (Dark-D) and a photo-current (Photo-P) of a flat fingerprint recognition device and a non-flat fingerprint recognition device. Generally, a dark current (Dark-D) and a photo-current (Photo-P) differ by four orders of magnitude. As shown in FIG. 5, FIG. 5 is a side-view test photo taken by an SEM electron microscope corresponding to the flat fingerprint recognition device. It can be seen the fingerprint recognition device (denoted by PIN) is relatively flat. While FIG. 6 is a side-view test photo taken by the SEM electron microscope corresponding to the non-flat fingerprint recognition device. It can be seen the flatness of the fingerprint recognition device (denoted by PIN) is poor. Table 1 shows dark current (Dark-D) and photo-current (Photo-P) values of the fingerprint recognition devices obtained from the corresponding tests in FIGS. 5 and 6. Table 1 shows dark current (Dark-D) and photo-current (Photo-P) values corresponding to the non-flat fingerprint recognition device at different positions (a hole 1, a hole 2 and a hole 3 represent three positions). Each position is tested twice (indicated by point1 and point2). The "flat" row in Table 1 represents a test result corresponding to the flat fingerprint recognition device. It can be seen the dark current (Dark-D) and photo-current (Photo-P) values of the flat fingerprint recognition device differ by four orders of magnitude, while the dark current (Dark-D) and photo-current (Photo-P) values of the non-flat fingerprint recognition device differ approximately by two orders of magnitude. As shown in FIG. 6, due to height differences caused by via holes, the stress distribution of the film layer where the fingerprint recognition device is located is non-uniform, defects increase, and even cracks appear. Moreover, electric field distribution at the height differences is non-uniform. This series of problems lead to a greatly increased dark current and poor uniformity of the fingerprint recognition device. The tested dark current of the fingerprint recognition device of this structure is two orders of magnitude larger than a dark current of a normal fingerprint recognition device, and the difference between a photo-current and a dark current is usually four orders of magnitude, which directly leads to attenuation of a signal-to-noise ratio of the fingerprint recognition device by more than half, resulting in serious noise in the fingerprint recognition device, and making fingerprint recognition impossible. The tested dark current (Dark-D) and photo-current (Photo-P) values corresponding to the flat fingerprint recognition device are normal, so fingerprint recognition can be achieved.

TABLE 1

| Type | Illumination | Point1 | Point2 | Ave. |
| --- | --- | --- | --- | --- |
| Hole 1 | D | 1.06E−12 | 1.02E−12 | 1.04E−12 |
|  | P | 1.76E−10 | 1.75E−10 | 1.76E−10 |
| Hole 2 | D | 2.50E−12 |  | 2.50E−12 |
|  | P | 1.82E−10 |  | 1.82E−10 |
| Hole 3 | D | 6.49E−13 | 1.05E−12 | 8.47E−13 |
|  | P | 1.75E−10 | 1.79E−10 | 1.77E−10 |
| Flat | D | 3.36E−14 | 1.31E−14 | 2.34E−14 |
|  | P | 2.38E−10 | 2.38E−10 | 2.38E−10 |

In summary, the above-mentioned two solutions for achieving the flatness of the fingerprint recognition device provided in the embodiment of the disclosure effectively improve reduce the dark current of the fingerprint recognition device and improve the characteristic difference between photo-current and dark current of the fingerprint recognition device while ensuring a pixel aperture ratio of an original product, solve the major problems of large device noise, poor quality of a fingerprint recognition rate image of a product, and a low fingerprint recognition rate caused by non-flatness of the fingerprint recognition device in the prior art, and are of great significance to mass production of display devices.

Figure 7:
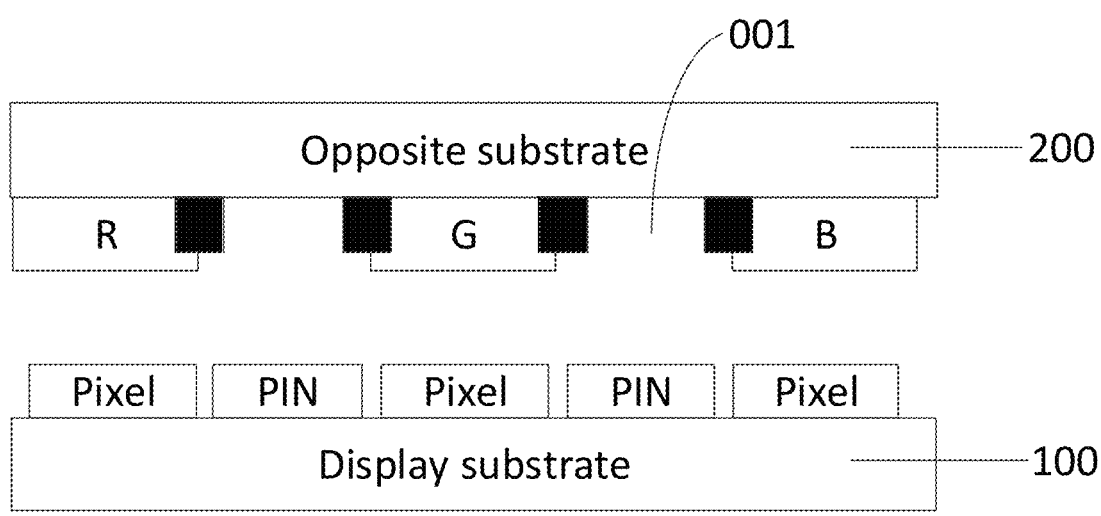
FIG. 7 is a schematic structural diagram of a display panel according to some embodiments of the disclosure.

Based on the same disclosed concept, an embodiment of the disclosure further provides a display panel, as shown in FIG. 7, including a display substrate 100 and an opposite substrate 200 disposed oppositely. The opposite substrate 200 includes a black matrix (denoted by BM), the BM having a plurality of pixel openings (denoted by R, G and B) and a plurality of fingerprint recognition openings 001. The display substrate 100 is the above-mentioned display substrate according to some embodiments of the disclosure, and the display substrate 100 has a plurality of pixel areas (denoted by Pixel) and fingerprint recognition areas (denoted by PIN) between the pixel areas (Pixel), the pixel opening (R, G and B) corresponding to the pixel areas (Pixel), and the fingerprint recognition openings 001 corresponding to the fingerprint recognition areas (PIN).

Figure 8:
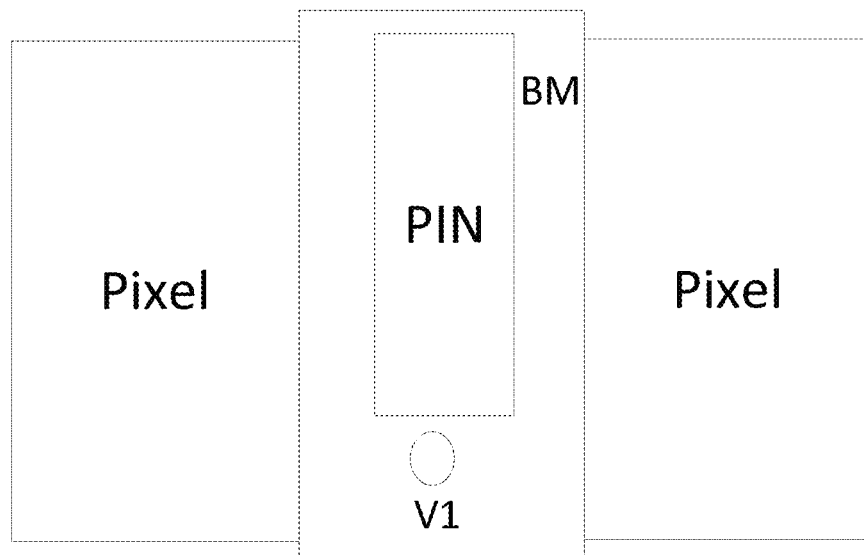
FIG. 8 is a bottom view of the display panel corresponding to FIG. 7.
Figure 9:
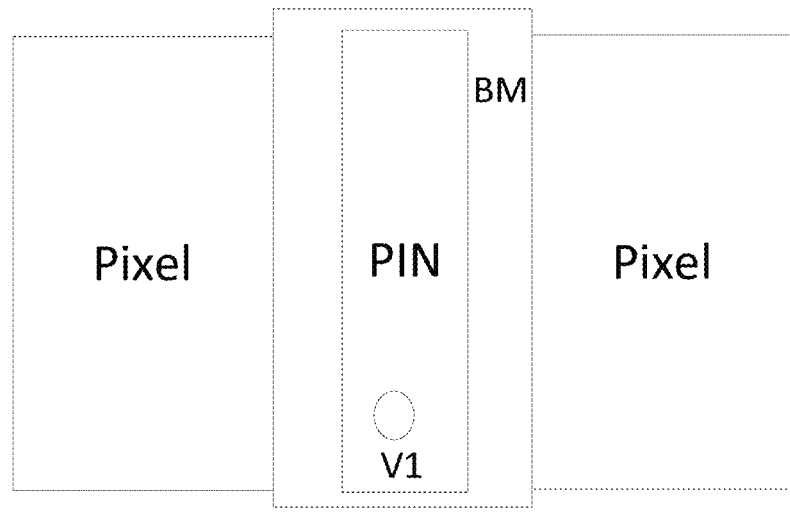
FIG. 9 is a bottom view of another display panel corresponding to FIG. 7.

In some embodiments, when the display substrate in the display panel shown in FIG. 7 adopts the structure shown in FIG. 3, a corresponding top view of which is shown in FIG. 8. From the top view, the via hole V1 is moved out of the fingerprint recognition device (denoted by PIN) and corresponds to the black matrix BM. When the display substrate in the display panel shown in FIG. 7 adopts the structure shown in FIG. 4, a corresponding top view of which is shown in FIG. 9. From this top view, the via hole V1 is still located right below the fingerprint recognition device (denoted by PIN), but the via hole V1 is filled flat by the first planarization layer, so the whole top surface of fingerprint recognition device is flat without reducing the area of the original fingerprint recognition device.

In some embodiments, other indispensable components of the display panel are present as understood by those skilled in the art, and are not described herein, nor should they be construed as limiting the disclosure. For the implementation of the display panel, reference may be made to the embodiment of the display substrate described above, and repeated description is omitted.

Figure 10:
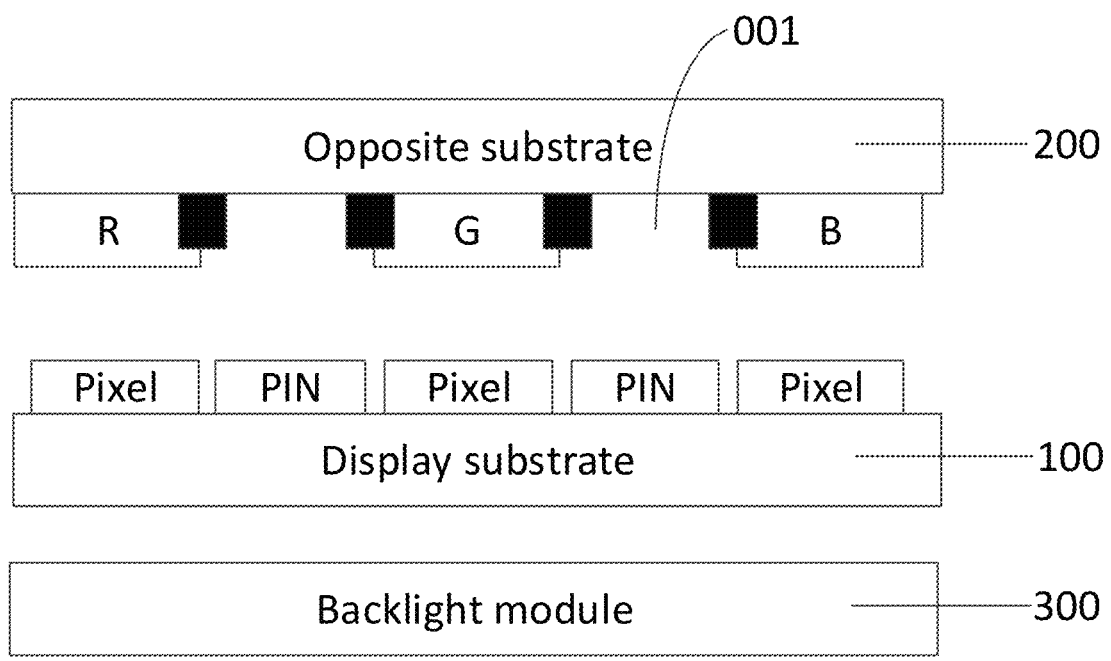
FIG. 10 is a schematic structural diagram of a display device according to some embodiments of the disclosure.

Based on the same disclosed concept, embodiments of the disclosure further provide a display device, which is a liquid crystal display device, as shown in FIG. 10. The display device includes a backlight module 300 and a display panel disposed oppositely, wherein the display panel is the above-mentioned display panel according to some embodiments of the disclosure, and the backlight module 300 is disposed on a side of the display substrate 100 away from the opposite substrate 200.

In some embodiments, the above-mentioned display device provided in the embodiment of the disclosure may be a mobile phone, a tablet computer, a television, a display, a notebook computer, a digital photo frame, a navigator, or any other product or component with a display function. Other indispensable components of the display device are present as understood by those skilled in the art, and are not described herein, nor should they be construed as limiting the disclosure. For the implementation of the display device, reference may be made to the embodiments of the display substrate described above, and repeated description is omitted.

In the above-mentioned display substrate, display panel and display device provided by embodiments of the disclosure, as the recess formed in the via hole by the first electrode of the fingerprint recognition device is filled with the insulating material, so that the surface of the first electrode on the side away from the base substrate is a flat surface, and the photosensitive layer is disposed on the flat surface, the flatness of the fingerprint recognition device can be improved, to reduce a dark current of the fingerprint recognition device, thereby improving the accuracy of fingerprint recognition.

Obviously, those skilled in the art can make various modifications and variations to the disclosure without departing from the spirit and scope of the disclosure. Thus, the disclosure is also intended to encompass these modifications and variations thereto so long as the modifications and variations come into the scope of the claims of the disclosure and their equivalents.

What is claimed is:

1. A display substrate, comprising:
   a base substrate;
   a drive circuit on the base substrate;
   an insulating layer on a side of the drive circuit away from the base substrate; and
   a fingerprint recognition device on a side of the insulating layer away from the base substrate;
   wherein
   the fingerprint recognition device comprises: a first electrode, a photosensitive layer and a second electrode that are disposed in a stacked manner;

wherein the first electrode is electrically connected to the drive circuit through a via hole running through the insulating layer;

the first electrode forms a recess in the via hole, and the recess is filled with an insulating material, so that a surface of the first electrode on a side away from the base substrate is a flat surface, and the photosensitive layer is disposed on the flat surface;

an orthographic projection of the photosensitive layer on the base substrate covers an orthographic projection of the via hole on the base substrate; and the display substrate further comprises:

a first planarization layer between the first electrode and the photosensitive layer, wherein the first planarization layer comprises a first portion filling the recess.

2. The display substrate of claim 1, wherein the first planarization layer further comprises a second portion, and an orthographic projection of the second portion on the base substrate and an orthographic projection of the fingerprint recognition device on the base substrate do not overlap.

3. The display substrate of claim 2, further comprising:

a first passivation layer between the first planarization layer and the first electrode;

wherein the first passivation layer has an opening that exposes the photosensitive layer.

4. The display substrate of claim 3, further comprising:

a first protective layer on a side of the second electrode away from the base substrate;

a bias voltage layer on a side of the first protective layer away from the base substrate; and a second planarization layer on a side of the bias voltage layer away from the base substrate;

wherein the bias voltage layer is electrically connected to the second electrode through a via hole running through the first protective layer.

5. The display substrate of claim 1, wherein the insulating layer comprises a second passivation layer, a third planarization layer, and a third passivation layer successively stacked between the drive circuit and the first electrode.

6. A display panel, comprising:

the display substrate of the claim 1 and an opposite substrate being disposed opposite to the display substrate;

wherein the opposite substrate comprises a black matrix, the black matrix having a plurality of pixel openings and a plurality of fingerprint recognition openings;

wherein the display substrate has a plurality of pixel areas and a plurality of fingerprint recognition areas between the plurality of pixel areas, the plurality of pixel openings corresponding to the plurality of pixel areas, and the plurality of fingerprint recognition openings corresponding to the plurality of fingerprint recognition areas.

7. The display panel of claim 6, wherein the first planarization layer further comprises a second portion, and an orthographic projection of the second portion on the base substrate and an orthographic projection of the fingerprint recognition device on the base substrate do not overlap.

8. The display panel of claim 7, further comprising:

a first passivation layer between the first planarization layer and the first electrode, wherein the first passivation layer has an opening that exposes the photosensitive layer.

9. The display panel of claim 8, further comprising:

a first protective layer on a side of the second electrode away from the base substrate;

a bias voltage layer on a side of the first protective layer away from the base substrate; and a second planarization layer on a side of the bias voltage layer away from the base substrate;

wherein the bias voltage layer is electrically connected to the second electrode through a via hole running through the first protective layer.

10. The display panel of claim 6, wherein the insulating layer comprises a second passivation layer, a third planarization layer, and a third passivation layer successively stacked between the drive circuit and the first electrode.

11. A display device, comprising a backlight module and the display panel of claim 9;

wherein the backlight module is disposed opposite to the display panel; and the backlight module is disposed on a side of the display substrate away from the opposite substrate.

* * * * *